United States Patent Office 3,123,548
Patented Mar. 3, 1964

3,123,548
REMOVAL OF METALLIC IMPURITIES FROM CRACKING CATALYSTS
James E. Connor, Jr., Wynnewood, and Clifford S. Shipley, Aldan, Pa., assignors to The Atlantic Refining Company, Philadelphia, Pa., a corporation of Pennsylvania
No Drawing. Filed Dec. 21, 1961, Ser. No. 161,257
8 Claims. (Cl. 208—120)

This invention relates to a method for the treatment of cracking catalysts which have become contaminated with coke-forming and gas-forming metallic impurities during use to improve the product distribution resulting from a hydrocarbon cracking process employing such catalysts. More particularly, it relates to a method for the removal of metallic impurities from silica-alumina cracking catalysts which have become contaminated with such impurities during the cracking of contaminated charge stocks.

For many years refiners have sought methods of cracking charge stocks highly contaminated with metal impurities such as nickel, iron and vanadium impurities. Specific examples of such stocks are reduced crudes and residual stocks which, if they could be cracked utilizing conventional gas oil cracking catalysts and equipment, could be converted to more desirable products such as gasoline and jet fuels. At present these stocks are suitable for use only as heavy industrial or marine fuels and therefore command a rather low price. In cracking such contaminated charge stocks with conventional hydrocarbon cracking catalysts such as silica-alumina, it has been found that the catalyst quickly becomes contaminated with deposits of the metallic impurities, thereby changing its hydrocarbon cracking characteristics and thus the product distribution resulting from the process so that large quantities of undesirable gas and coke are produced at the expense of desired products. Moreover, the conventional methods of catalyst regeneration by burning with air to remove the coke do not remove the metallic impurities and, accordingly, they build up on the catalyst to the extent where it becomes totally unfit for further use.

Various methods have been proposed for removing these metallic impurities from the catalyst such as washing with water, washing with acidulated water, treating with mineral acids, washing with aqueous solutions of inorganic salts and various combinations of these but none of these methods has been found to be successful.

A method now has been found whereby the metallic impurities deposited on a silica-alumina cracking catalyst during the cracking of highly contaminated charge stocks may be removed to such an extent that the original hydrocarbon cracking characteristics of the catalyst are substantially restored while the stability of the catalyst is maintained and the catalyst thereby rendered suitable for reuse in the cracking of highly contaminated charge stocks. Stated in other words, the coke-forming and gas-forming tendencies of the catalyst are reduced so that substantially the original product distribution resulting from the cracking process is restored by the method of this invention.

This method comprises contacting the contaminated silica-alumina cracking catalyst at an elevated temperature with a hydrogen sulfide-containing gas, contacting the hydrogen sulfide-treated catalyst with molecular oxygen and thereafter with a suspension of a cation exchange resin in the hydrogen cycle in an aqueous medium to remove the metallic impurities from the catalyst. Finally, the decontaminated catalyst is separated from the resin and dried.

It is an object of this invention to provide a method for treating a silica-alumina cracking catalyst which has been utilized in the cracking of a metal-contaminated charge stock to improve the hydrocarbon cracking characteristics of the catalyst and render it suitable for reuse in such a cracking process.

Another object of this invention is to provide a method for the removal of metallic impurities from silica-alumina cracking catalysts which have become contaminated with such impurities during use in the cracking of highly contaminated charge stocks.

It is another object of this invention to provide a method for the treatment of silica-alumina cracking catalysts which have become contaminated with coke-forming and gas-forming metallic impurities to remove such impurities from the catalyst while maintaining the stability of the catalyst.

Other objects of this invention will be apparent from the description and claims that follow.

In accordance with this invention, a silica-alumina cracking catalyst which has become contaminated with coke-forming and gas-forming metallic impurities during the cracking of highly contaminated charge stocks is contacted with a gas containing hydrogen sulfide at a temperature in the range from 900° F. to 1100° F. The catalyst is then contacted with molecular oxygen at a temperature in the range from 350° F. to 1100° F. While it is preferred to carry out the contacting with the molecular oxygen at atmospheric pressure, air at superatmospheric pressures may be used such that the partial pressure of the oxygen is at least one atmosphere. The catalyst, after being contacted with the oxygen, is contacted with a suspension of a cation exchange resin in the hydrogen cycle in an aqueous medium under conditions such that the coke-forming and gas-forming metallic impurities are removed from the catalyst while the steam and high temperature stability of the catalyst is maintained. The treated catalyst is separated from the resin and dried so that it may be returned to the cracking process for reuse.

The silica-alumina cracking catalysts which may be treated by the method of this invention include the wholly synthetic silica-alumina catalysts, the semi-synthetic silica-alumina catalysts and the so-called natural catalysts. The wholly synthetic silica-alumina catalysts include those made by the well-known commercial methods such as coprecipitation or impregnation methods. Such catalysts contain from 7 percent by weight of 30 percent by weight of alumina with the remainder being silica. The semisynthetic silica-alumina cracking catalysts may be produced by the addition of silica and alumina to a natural clay or an acid-treated clay to give alumina contents in the range of about 30 percent by weight to 35 percent by weight of the finished catalyst. In the so-called natural catalysts, the natural clay may be acid treated only or alumina may be added to the acid-treated clay to give alumina contents ranging from about 15 percent by weight to 50 percent by weight of the finished catalyst.

For purposes of clarity, the invention will be described in detail hereinafter with reference to powdered silica-alumina catalysts such as those employed in the so-called fluid catalytic cracking process.

In the practice of this invention a powdered silica-alumina catalyst such as that used in a fluid catalytic cracking process and which has become contaminated with substantial amounts of coke-forming and gas-forming metallic impurities during use in the cracking of metal contaminated charge stocks is fluidized with a gas such as nitrogen and heated from room temperature to the desired reaction temperature, which ranges from 900° F. to 1100° F. and preferably from 950° F. to 1000° F. Hydrogen sulfide is added to the nitrogen fluidizing gas when the catalyst has reached reaction temperature. The catalyst is contacted at the reaction temperatures with the gas containing the hydrogen sulfide for a time sufficient to convert the metal compounds deposited on the catalyst to the metal sulfides, the length of time required for this reaction being dependent primarily upon the reaction temperature and only to a small extent upon the quantity of contaminants on the catalyst. It has been found necessary to treat the catalyst with a large excess of hydrogen sulfide over the stoichiometric amount required to convert the metals to their sulfides when a flowing gas stream is used because of the inherent inefficiencies in contacting a solid with a gas. Thus, satisfactory results have been obtained when the quantity of hydrogen sulfide has ranged from 25 to 50 times the calculated stoichiometric quantity. When static conditions are employed, or very low flow rates, the quantity of hydrogen sulfide required is substantially the stoichiometric quantity. Contact periods as short as 15 minutes may be sufficient when reaction temperatures at the higher end of the range are utilized to treat less severely contaminated catalysts while with reaction temperatures at the lower end of the range, for example 950° F., and with relatively highly contaminated catalysts, reaction times as long as 30 minutes or one to two hours are preferred. In general, little advantage has been found for contacting periods longer than 2 to 3 hours provided the concentration of hydrogen sulfide in the treating gas is sufficient, as has been described. It is also preferred to carry out the contacting at atmospheric pressures or at pressures only slightly above atmospheric as required for fluidization but, in general, not in excess of about 50 p.s.i.g.

It has been found that during this contacting period the hydrogen sulfide converts the metallic impurities which are deposited on the surface of the catalyst to the corresponding metal sulfides. It is well known that some metallic impurities become buried within the structure of a silica-alumina catalyst by collapse of the pore structure during the alternate reaction and regeneration periods of the catalyst-use cycle. Such buried impurities do not contribute to the coke-forming and gas-forming tendencies of the catalyst. Thus, although most probably these impurities are not converted to the sulfide during the hydrogen sulfide treatment step, this is immaterial to the operability of the instant invention since they are not deleterious to the cracking process.

After the hydrogen sulfide treating step, the catalyst is contacted with molecular oxygen at temperatures in the range from about 350° F. to 1100° F. It is believed that the metallic sulfides are converted by the oxygen into the oxides or oxy-sulfides which are more readily removable by the subsequent cation exchange contacting step. The length of time required for the molecular oxygen treatment step varies as has been described for the hydrogen sulfide treatment step, however, in general, a contact period of at least 30 minutes should be used while treatment times of 2 hours have been found to be particularly suitable. Treatment periods longer than 2 to 3 hours have not been found to show any substantial additional improvements. During the molecular oxygen contacting step, it is preferred that the catalyst be fluidized with the oxygen or air under pressure, as has been described. After the desired contacting time, the catalyst is allowed to cool to room temperature while being fluidized either with the oxygen or with air substituted for the oxygen and thereafter the catalyst may stand in contact with air until it is contacted with the cation exchange resin.

It has been found that compounds which are acidic are formed by the hydrogen sulfide and oxygen treatment steps. Consequently, when highly contaminated catalysts are being treated there may be a sufficient quantity of these acidic compounds present to lower the pH of the aqueous solution during cation exchange to an undesirable level. Therefore, in order to control the pH of the subsequent cation exchange step, it may prove desirable to first wash at least a portion of these compounds from the catalyst. A convenient method of washing consists of passing a stream of hot water (190° F. to 212° F.) in an upflow manner through the catalyst bed so that thorough contact of each part of the catalyst with the water is obtained. The water should not be passed up through the catalyst at such a rate that it will elutriate the finer portions of the catalyst from the coarser portions but, in general, a superficial velocity of one foot per minute is a convenient flow rate. The water washing is carried out until the desired pH has been reached. It has been found that only approximately 50 weight percent of the total quantity of metal impurities deposited on the catalyst can be removed by water washing, but the CPF remains prohibitively high so that the subsequent cation exchange step cannot be eliminated. The only function of the washing, therefore, is to permit operation of the subsequent cation exchange step within the preferred pH range of 2.7 to 4.2. If washing is omitted, there may be sufficient acidic compounds on the catalyst that the pH of the aqueous medium during cation exchange will be below 2.7 i.e. from 2.0 to 2.5, for example, which is within the operable but less preferred range, as will be described.

It has been noted that during the oxygen contacting step the hydrogen sulfide treated catalyst changes color from dark gray to a very light gray indicating that some type of oxidation is taking place since, when the hydrogen sulfide treated catalyst was heated in a nitrogen atmosphere, it did not change color. It has been found that very poor metal removal and decontamination of the catalyst results if the catalyst is treated with hydrogen sulfide in the usual manner and then cation exchanged without being treated with oxygen after the hydrogen sulfide step, thus indicating that some type of reaction occurs during the steps which renders the metallic impurities more susceptible to removal by cation exchange.

Following the oxygen treatment step, the catalyst is contacted with a suspension of a cation exchange resin in the hydrogen cycle in an aqueous medium at a pH ranging from 2.0 to 4.5. The contacting is carried out at a temperature in the range from 75° F. to the temperature at which the cation exchange resin disintegrates for from 1 to 24 hours with a catalyst to resin ratio preferably in the range from 0.25 to 3.0 grams per milliliter of wet cation exchange resin. It has been found necessary to control the pH within this range in order to remove the contaminating metals while maintaining the steam stability and high temperature stability of the silica-alumina catalyst. After the catalyst has been contacted with the cation exchange resin, it is separated from the resin and dried for reuse.

For ease in handling in contacting the catalyst with the cation exchange resin, the catalyst preferably should not constitute more than about 40 weight percent of the catalyst-water mixture and not less than about 10 percent by weight of the mixture. If the mixture contains more than 40 weight percent silica-alumina, when the required quantity of cation exchange resin is added thereto, the solids content of the mixture becomes too great to be handled readily, consequently such mixtures are not desired. If the silica-alumina is present in concentrations of less than about 10 weight percent, the total volume which must be treated becomes exceedingly large and therefore such dilute mixtures are not preferred.

The aqueous mixture of the silica-alumina cracking catalyst of the hydrocarbon catalytic cracking process is contacted with solid particles of the cation exchange resin in the hydrogen cycle. It is desirable that the particles of the cation exchange resin be of a different size from the silica-alumina particles in order that after the contacting period the particles of cation exchange resin may be separated from the silica-alumina catalyst particles by simple conventional methods such as by screening or by elutriation. For example, it has been found that the particles of a silica-alumina catalyst which has been used in a fluid catalystic cracking unit may be separated readily from the particles of the cation exchange resin since the particle size of the catalyst is such that it will pass through a 100 mesh U.S. Standard Sieve and the particle size of the cation exchange resin as produced commercially is in the range of 10 to 50 mesh U.S. Standard Sieve.

The catalyst and resin may be contacted either in a continuous manner or batchwise. In either method it is important that the mixture be agitated thoroughly to provide intimate contact between the resin and catalyst during the entire period of contact. Agitation with mechanical agitators may be employed or, alternatively, agitation with a gaseous medium such as steam or air may be utilized. When the contacting is carried out at elevated temperatures, heating may be accomplished by the use of jacketed vessels which may supply heat to the mixture from an external source or, alternatively, the heat may be supplied to the mixture by the steam agitation.

After the catalyst has been contacted with the cation exchange resin, it may be separated from the resin by any conventional method. One method is to separate the catalyst from the resin by elutriating the catalyst from the resin with an ascending aqueous stream. Another method involves separating the resin particles from catalyst particles by screening, utilizing conventional equipment.

The quantity of cation exchange resin to be employed in contacting the silica-alumina is to some extent a function of the quantity of metallic impurities associated with the catalyst. However, in general, the quantity required in order to improve the hydrocarbon cracking characteristics of the silica-alumina catalyst is somewhat greater than the amount calculated solely on the basis of the quantity of metallic contaminants to be removed. In general, it has been found that the ratio of catalyst to cation exchange resin should range preferably between 0.25 to 3.0 grams of catalyst per milliliter of wet cation exchange resin although somewhat higher ratios have been found to be suitable.

One mode of carrying out the process of the instant invention is to remove all of the catalyst from the catalytic cracking unit and contact the total quantity of used catalyst contained in the unit according to the process of the invention to remove the coke-forming and gas-forming metal contaminants from the catalyst. After treatment the catalyst is replaced in the unit. This mode of operation requires that the cracking unit be shut down and hence it is most applicable when the unit is shut down for mechanical overhauling. This mode can be carried out only on a periodic basis with long intervals between treatments and, accordingly, it is not preferred.

The preferred mode of carrying out the process of the instant invention is to separate a portion of the catalyst currently in use in the cracking process from the cracking unit without interrupting the operation of the unit. This may be carried out by continuously removing catalyst from some convenient location in the unit, for example, from the dense phase in the regenerator. After treatment the catalyst may be returned continuously to the unit. If desired, however, batches of catalyst may be removed on a periodic basis, for example, once a shift, once a day, or less frequently. In either case, the portion of the catalyst being treated may be expressed in weight percent of the total quantity of the catalyst being employed in the cracking process per unit of time, normally per day. In the cracking of residual materials which are highly contaminated, it is generally required that amounts ranging from 10 percent to 40 percent of the total catalyst in the unit be treated per day. Amounts ranging between 20 percent and 25 percent have been found to be particularly suitable. If, however, the level of contaminants in the charge should decrease because of cleaner charge stocks or if the refiner should determine that a somewhat higher level of contamination on the catalyst is suitable for his individual purposes, smaller quantities of catalyst may be treated, for example 5 percent of the total catalyst in the unit per day may be treated. If large amounts of catalyst are being treated per day, it may be necessary to increase the total amount of catalyst being employed in the process in order to maintain the proper quantity of catalyst in the unit.

In the preferred mode of operation, a portion of the catalyst is continuously removed and treated so that the contamination is reduced to a low level and thus the desired improvement in the hydrocarbon cracking characteristics of the cracking catalyst is obtained.

The cation exchange resins suitable for the method of this invention are the commercially available strong acid synthetic type cation exchange resins such as Amberlite IR–120 or Permutit-Q which are produced by the sulfonation of the copolymer prepared from a mixture of styrene and divinylbenzene. Amberlite IR–120 and Permutit-Q are well known to the art of ion exchange and their preparation is described in detail in both the patented art and in the technical literature, in particular, the detailed method of their preparation is set forth starting with the first full paragraph on page 84 of the book by Robert Kunin, entitled "Ion Exchange Resins," second edition, John Wiley and Sons, Inc., New York (1958).

The cation exchange resins as manufactured and shipped are wet with water and are used in this condition. When at least a portion of the ion exchange capacity of the cation exchange resin has become saturated by the cations removed from the catalyst, the exchanger is regenerated by acid treatment in accordance with conventional methods recommended by the manufacturer. Generally, the resin after each contact with the catalyst is regenerated even though its exchange capacity may be only partially saturated in order to insure that in the next cycle there is present the above-mentioned required excess of the resin in the hydrogen cycle. However, when the quantities of contaminants on the catalyst are low, it may be found unnecessary to regenerate all of the resin after each contact with the catalyst.

Since the commercialization of the catalytic cracking process, a number of laboratory tests have been developed which have been proved to measure accurately the properties of the catalyst when used in these commercial units.

The hydrocarbon cracking activity of the catalysts treated by the process of this invention was measured by the distillate-plus-loss ($D+L$) scale according to the method of Birkhimer et al. which is set forth in "A Bench Scale Test Method for Evaluating Cracking Catalysts," Proceedings of the American Petroleum Institute, Division of Refining, volume 27 (III), page 90 (1947). According to the Birkhimer et al. $D+L$ scale for the measurement of activity of the cracking catalyst utilizing 200 grams of catalyst in the test, it would be possible to have a theoretical maximum $D+L$ of 100; however, in general, the maximum $D+L$ for a fresh synthetic silica-alumina cracking catalyst will range between 90 and 95.

The hydrocarbon cracking characteristics of the catalysts treated in accordance with the process of this invention were determined by measuring the carbon producing tendencies of such catalysts according to the 40-gram method set forth in the aforementioned Birkhimer et al. article and also described in the article by J. J. Rothrock et al. entitled "Fluid Cracking Catalyst Contamination, Development of a Contaminant Test," Industrial and Engineering Chemistry, volume 49, page 272 (1957). According to this method the carbon producing tendencies of the catalyst are expressed as the carbon producing factor (CPF). Carbon producing factor is defined as the ratio of carbon produced from a standard feed stock with a catalyst under test compared to the carbon produced from the same material from a standard catalyst at the same conversion level. Hence, a carbon producing factor of 3 means that the metal-contaminated catalyst in question produces three times as much carbon as a standard uncontaminated fresh catalyst at the same conversion. Thus, in measuring carbon producing factors each catalyst was tested by employing a standard charge stock under standard conditions in accordance with the Birkhimer et al. method and compared with a standard catalyst tested with an identical feed stock under identical conditions. Consequently, the carbon producing factors of the catalysts tested are comparable one to the other and are comparable to the standard catalyst which is a commercial, fresh, uncontaminated synthetic silica-alumina cracking catalyst containing approximately 13 percent by weight of alumina and 87 percent by weight of silica and which has a carbon producing factor (CPF) of 1.0 at all conversion levels by definition. A more detailed explanation of CPF is set forth in the paper by H. R. Grane, J. E. Connor, Jr., and G. P. Masologites entitled "The Behavior of Metal Contaminants in Catalytic Cracking," Preprints of Papers presented May 11, 1961, at 26th Midyear Meeting of the American Petroleum Institute's Division of Refining at Houston, Texas. It is preferred that after treatment according to the process of this invention, the CPF has a value as near to 1.0 as possible, in general, not greater than about 1.5 to 1.6, although for economic reasons, when highly contaminated charge stocks are being cracked, it may be deemed sufficient to reduce the CPF to a somewhat lesser extent.

In addition to the activity and coke-producing properties of a commercial cracking catalyst, the stability of such a catalyst to deactivation under conditions encountered in the commercial unit is also important. Specifically, these conditions are steam and high temperatures. The catalyst is subjected to steaming in the stripping section and in the regeneration zone of the unit and also encounters elevated temperatures in the order of 1150° F. or higher in the regeneration zone. Both of these factors have a deactivating effect on the catalyst. The stability of the catalyst toward steam is measured by determining the $D+L$ of the catalyst both prior to and after steaming at 1050° F. The loss in $D+L$ gives a measure of stability. Similarly, the loss in $D+L$ when the catalyst is heated to 1700° F. an air gives a measure of its high temperature stability.

One of the important variables of the ion exchange contacting step is the pH of the aqueous medium. It has been found utilizing the aforementioned stability test that, at a pH above about 2.7, the catalyst may be decontaminated without deleteriously affecting the steam stability and high temperature stability although a pH of as low as 2.0 may be employed since in the range of 2.0 pH to 2.7 pH the stability of the catalyst is substantially, although not completely, maintained. The upper pH limit is determined by the quantity of coke-forming and gas-forming metal contaminants which can be removed. If the pH is too high the quantity of such contaminants thus removed is so low that little or no improvement in the hydrocarbon cracking characteristics will be obtained. Consequently, it has been found necessary to have a pH below about 4.5 and preferably below 4.2 in order to remove sufficient coke-forming and gas-forming metal contaminants to improve the hydrocarbon cracking characteristics of the catalyst. Accordingly, the catalyst may be contacted with the cation exchange resin in an aqueous medium having a pH in the range of 2.0 to 4.5 and preferably within the range of 2.7 to 4.2. In order to attain the desired pH during the contacting period between the cation exchange resin and the catalyst, it may be necessary to provide the required acidity by adding an acid. The preferred acid is sulfuric, however, hydrochloric, oxalic, citric, tartaric and similar acids have been found to be suitable for controlling the pH of the aqueous medium during the contacting period. The acid may be added either to the resin slurry before the catalyst is added or the acid may be added in increments during the contacting period in order to maintain a somewhat more constant pH.

The temperature of contacting the catalyst with the cation exchange resin may range from about 75° F. to the temperature at which the cation exchange resin disintegrates. Cation exchange resins will generally withstand temperatures within the range of 250° F. to 260° F. and certain heat resistant cation exchangers will withstand higher temperatures. When operating at these higher temperatures, it is necessary, of course, to employ superatmospheric pressures to keep the aqueous medium in the liquid phase.

It is necessary to use longer contacting periods when employing temperatures at the lower end of the range than when employing moderately elevated temperatures such as 120° F. and higher. Thus, at 75° F. contact periods as long as 24 hours are required to obtain the same improvement to the catalyst as may be obtained with contact periods of only 2 or 3 hours at the higher temperatures. In general, contact periods of at least one hour and preferably two hours should be used for temperatures in the range of 120° F. to the disintegration temperature of the resin. The preferred contact temperatures range from 120° F. to 250° F. and the preferred contact periods from 2 to 8 hours.

It will be recognized that mildly contaminated catalysts require less severe conditions and heavily contaminated catalysts will require somewhat more severe conditions although the ranges set forth are suitable for the vast majority of commercial operations.

The following examples are provided for the purpose of illustrating certain specific embodiments and critical features of the invention and to show the utility of the invention.

In order to demonstrate the effect of reaction condition variables on the process, a standard contaminated catalyst was employed. A fresh commercial synthetic silica-alumina catalyst (approximately 13 weight percent alumina, 87 weight percent silica) of the type employed in fluid catalytic cracking units having a particle size such that it passed through a 100 mesh U.S. Standard Sieve was artificially deactivated and contaminated. The deactivation was carried out by steam treatment at 1050° F. for 18 hours under 30 p.s.i.g. steam pressure to remove approximately one-third of the cracking activity of the catalyst, i.e. it had a $D+L$ of 60 as measured by the Birkhimer et al. method. The deactivated catalyst samples were contaminated with nickel by heating the catalyst to 700° F. and contacting the catalyst with a solution of nickel naphthenate in furnace oil whereby nickel compounds became deposited on the catalyst. The details of this method of contamination are set forth in the aforementioned article by J. J. Rothrock et al. The contacting was continued until approximately 0.5 weight percent nickel had been deposited on each catalyst sample. The nickel deposited on the catalyst in the form of carbonaceous compounds was calculated on the basis of nickel metal. Each catalyst sample therefore corresponded to a highly contaminated used silica-alumina cracking catalyst. These standard contaminated catalyst samples containing 0.5 weight percent nickel had a carbon producing factor (CPF) of 20.

*Example I*

A sample of the standard deactivated silica-alumina catalyst contaminated with 0.5 weight percent nickel prepared as described was contacted with Permutit-Q cation exchange resin in water suspension for 4 hours under reflux conditions (212° F.) at a pH of 2.9. The ratio of catalyst to resin was 0.5 gram of catalyst per milliliter of wet cation exchange resin. The resin was separated from the catalyst by screening and was dried. The nickel content of the catalyst had been reduced to 0.37 weight percent and the carbon producing factor of the catalyst was found to be 11, showing that whereas some improvement had been made, the catalyst was of no commercial value.

Example II

A sample of the standard deactivated and contaminated silica-alumina catalyst prepared as has been described was fluidized with nitrogen and heated while fluidized to 950° F. under atmospheric pressure. Hydrogen sulfide amounting to about 20 volume percent of the nitrogen was added to the nitrogen when this temperature was reached. The catalyst was contacted at this reaction temperature with the nitrogen-hydrogen sulfide mixture for two hours, then the flow of hydrogen sulfide was discontinued and the catalyst was purged with nitrogen while its temperature was raised from 950° F. to 1050° F. The nitrogen was replaced with a stream of molecular oxygen and the catalyst was treated with the oxygen at 1050° F. for two hours. All of the contacting steps were carried out at atmospheric pressure. After cooling, the catalyst was contacted with Permutit-Q cation exchange resin in the same manner and under the same conditions as described in Example I except that the pH of the aqueous solution during the treatment was 2.3. After separation of the catalyst from the resin, the nickel content of the catalyst was found to be 0.064 weight percent and the CPF 1.1, demonstrating that, when compared with Example I, the treatment with hydrogen sulfide and oxygen prior to cation exchange is critical for the production of a catalyst having the desired hydrocarbon cracking characteristics.

Example III

In another experiment the standard deactivated silica-alumina catalyst prepared as has been described was pelleted into cylindrical pellets measuring approximately ⅛-inch in diameter by ⅛-inch in thickness. The pelleted catalyst was placed in a fixed bed and heated in a nitrogen atmosphere to a temperature of 950° F. At this temperature hydrogen sulfide amounting to about 20 volume percent of the nitrogen was added to the nitrogen and the nitrogen-hydrogen sulfide stream was contacted with the catalyst for two hours. At the end of the two hours, the flow of hydrogen sulfide was discontinued and the catalyst was purged with nitrogen while being heated from 950° F. to 1050° F. The nitrogen was replaced with a stream of molecular oxygen and the catalyst was contacted with the oxygen for two hours at 1050° F. All contacting was carried out under atmospheric pressure. After cooling, the catalyst pellets were washed with hot water and then ground. The catalyst that passed through a 100 mesh U.S. Standard Sieve was contacted with Permutit-Q cation exchange resin in the same manner and under the same conditions as described in Examples I and II except that the pH of the aqueous medium was 2.95. After separating the catalyst from the resin and drying, the catalyst was found to have a nickel content of 0.062 weight percent and a CPF of 1.0. This experiment demonstrates that the hydrogen sulfide and oxygen pretreatment may be applied to pelleted catalysts.

Example IV

A sample of the standard deactivated and contaminated silica-alumina catalyst prepared as has been described was fluidized with nitrogen and heated while fluidized to 950° F. Hydrogen sulfide amounting to about 20 volume percent of the nitrogen was added to the nitrogen when this temperature was reached. The catalyst was contacted at this reaction temperature with the nitrogen—hydrogen sulfide mixture for two hours, then the flow of hydrogen sulfide was discontinued and the catalyst was purged with nitrogen. The hydrogen sulfide treated catalyst was contacted with molecular oxygen at 950° F. for two hours. All contacting steps were at atmospheric pressure. The catalyst was then washed by passing a stream of demineralized water upwardly through the catalyst at a temperature of 200° F. to 212° F. for about eight hours. The washed catalyst after being dried was found to have a nickel content of 0.26 and a CPF above 10.

This experiment demonstrates that the cation exchange step is necessary for the removal of the coke-forming and gas-forming metal contaminants in order to produce a catalyst having the desired hydrocarbon cracking characteristics in accordance with this invention.

Example V

A sample of the standard deactivated and contaminated silica-alumina catalyst prepared as has been described was treated for two hours at 950° F. with hydrogen sulfide admixed with nitrogen in the same manner as described in the preceding examples. After the nitrogen purge the catalyst was subjected to cation exchange directly without being contacted with oxygen. The contacting was carried out as described in Example I with the pH of the aqueous solution being 2.5. The catalyst after being separated from the resin and dried had a nickel content of 0.19 weight percent and a CPF of 4.3, showing that the step of contacting with oxygen after the hydrogen sulfide contacting step is critical in order to obtain a final catalyst with the desired hydrocarbon cracking characteristics.

Example VI

Three samples of the standard deactivated and contaminated silica-alumina catalyst were treated in the same manner as described in Example II except that the hydrogen sulfide contacting time and temperature were varied and the catalysts were washed with hot water prior to the cation exchange steps in order to control the pH during cation exchange. The first was contacted with the hydrogen sulfide-nitrogen gaseous mixture for two hours at 750° F. and thereafter with oxygen at 950° F. for two hours and cation exchanged at a pH of 2.7. The finished catalyst had a nickel content of 0.08 weight percent and a CPF of 2.7, showing that the temperature of the hydrogen sulfide contacting step was too low. The second sample was contacted with the hydrogen sulfide-nitrogen gaseous mixture for one-half hour at 950° F. The catalyst thereafter was treated in exactly the same manner as the first sample. The finished catalyst had a nickel content of 0.06 and a CPF of 1.6, showing that at the 0.5 weight percent nickel level of contamination the one-half hour hydrogen sulfide treatment time is not as effective or desirable as the longer periods. The third sample was contacted with the hydrogen sulfide-nitrogen mixture for two hours at 1250° F. and thereafter with oxygen at 950° F. for two hours. The pH of the aqueous medium during the cation exchange step was 2.9. The finished catalyst had a nickel content of 0.11 weight percent and a CPF of 4.0, showing that the hydrogen sulfide treating temperature was too high.

Example VII

Three samples of the standard deactivated and contaminated silica-alumina catalyst were treated in the same manner as described in Example II except that the oxygen contacting time and temperature were varied and the catalysts were washed with hot water before the cation exchange step. The pH of the cation exchange treat was approximately 2.7 in each experiment. The first sample was contact with oxygen at 350° F. for two hours and gave a finished catalyst having a nickel content of 0.07 weight percent and a CPF of 1.64, thus showing that this temperature was borderline. The second sample was contacted with oxygen for two hours at 750° F. and gave a finished catalyst having a nickel content of 0.06 and a CPF of 1.09. The third sample was contacted with oxygen at 950° F. for one-half hour and gave a finished catalyst having a nickel content of 0.09 and a CPF of 5.1, showing that the contact time was too short to render the contaminants more readily removable by the ion exchange treatment step.

Example VIII

Two samples of the standard deactivated and contaminated silica-alumina catalyst were treated in the same manner as described in Example II except that air was substituted for the oxygen and the catalysts were washed prior to cation exchange. In the first treat, air at 950° F. and atmospheric pressure was employed for two hours and the pH of the aqueous solution during cation exchange was 2.7. The treated catalyst had a nickel content of 0.10 weight percent and a CPF of 2.9. In the second treat, air at 950° F. and 60 p.s.i.g. was employed for two hours and the pH of the aqueous solution during cation exchange was 2.7. The treated catalyst had a nickel content of 0.08 and a CPF of 1.3. These experiments show that the best results are obtained when the partial pressure of the molecular oxygen during the oxygen treatment step is one atmosphere, since the partial pressure of the oxygen in air at 60 p.s.i.g. is approximately one atmosphere.

Example IX

A fresh commercial silica-alumina catalyst of the type utilized in fluidized cracking processes containing approximately 13 weight percent alumina, 87 weight percent silica was charged to a semi-plant scale catalytic cracking unit. A West Texas-Permian reduced crude of 884° F. mid-boiling point, 20.5° API gravity and with a 4.5 Ramsbottom carbon was passed over the catalyst until the catalyst had a CPF of 12.0, an iron content of 0.26 weight percent, and a nickel content of 0.11 weight percent.

One portion of this catalyst was subjected to cation exchange without pretreatment with hydrogen sulfide and oxygen. The method employed was the same as that described in Example I except that a pH of 2.75 was employed during the cation exchange. The treated catalyst had a CPF of 4.2, an iron content of 0.15 weight percent and a nickel content of 0.07 weight percent. The other portion of the catalyst was treated with hydrogen sulfide and oxygen before cation exchange in the same manner as described in Example II, except the catalyst was washed prior to cation exchange, the pH of the aqueous solution during the cation exchange treatment being 2.6. The treated catalyst had a CPF of 1.6 with an iron content of 0.09 weight percent and a nickel content of 0.057 weight percent. These data demonstrate that it is necessary to employ the hydrogen sulfide and oxygen treatment prior to cation exchange in order to give the desired improvement of the hydrocarbon cracking characteristics of a catalyst contaminated during use in the cracking of highly contaminated charge stocks.

We claim:

1. A method for improving the product distribution resulting from a hydrocarbon catalytic cracking process in which is employed a silica-alumina cracking catalyst which comprises
   (a) separating at least a portion of the total catalyst from the process,
   (b) contacting the separated catalyst at a temperature ranging from 900° F. to 1100° F. with a hydrogen sulfide-containing gas,
   (c) contacting the hydrogen sulfide treated catalyst with molecular oxygen at a partial pressure of at least one atmosphere and at a temperature ranging from 350° F. to 1100° F. for at least 30 minutes,
   (d) contacting the oxygen-treated catalyst with a cation exchange resin in the hydrogen cycle in an aqueous medium at a pH such that the coke-forming and gas-forming metal contaminants are removed from the catalyst while the stability of the catalyst is substantially maintained,
   (e) separating the contacted catalyst from the resin, and
   (f) returning the contacted catalyst to the hydrocarbon cracking process.

2. A method for improving the product distribution resulting from a hydrocarbon catalytic cracking process in which is employed a silica-alumina cracking catalyst which comprises
   (a) separating at least a portion of the total catalyst from the process,
   (b) contacting the separated catalyst at a temperature ranging from 900° F. to 1100° F. with a hydrogen sulfide-containing gas,
   (c) contacting the hydrogen sulfide-treated catalyst with molecular oxygen at a partial pressure of at least one atmosphere and at a temperature ranging from 350° F. to 1100° F. for at least 30 minutes,
   (d) contacting the oxygen-treated catalyst with a cation exchange resin in the hydrogen cycle in an aqueous medium at a pH ranging from 2.0 to 4.5 with a catalyst to resin ratio ranging from 0.25 gram to 3.0 grams per milliliter of wet cation exchange resin,
   (e) separating the contacted catalyst from the resin, and
   (f) returning the contacted catalyst to the hydrocarbon cracking process.

3. A method of improving the product distribution resulting from a hydrocarbon catalytic cracking process in which is employed a silica-alumina cracking catalyst which comprises
   (a) separating at least a portion of the total catalyst from the process,
   (b) contacting the separated catalyst at a temperature ranging from 900° F. to 1100° F. with a hydrogen sulfide-containing gas,
   (c) contacting the hydrogen sulfide-treated catalyst with molecular oxygen at a partial pressure of at least one atmosphere and at a temperature ranging from 350° F. to 1100° F. for at least 30 minutes,
   (d) contacting the oxygen-treated catalyst with a cation exchange resin in the hydrogen cycle in an aqueous medium at a pH ranging from 2.0 to 4.5 at a temperature ranging from 75° F. to the temperature at which the cation exchange resin disintegrates for from 1 to 24 hours with a catalyst to resin ratio ranging from 0.25 gram to 3.0 grams per milliliter of wet cation exchange resin,
   (e) separating the contacted catalyst from the resin, and
   (f) returning the contacted catalyst to the hydrocarbon cracking process.

4. A method for improving the product distribution resulting from a hydrocarbon catalytic cracking process in which is employed a silica-alumina cracking catalyst which comprises
   (a) separating at least a portion of the total catalyst from the process,
   (b) contacting the separated catalyst at a temperature ranging from 900° F. to 1100° F. with a hydrogen sulfide-containing gas,
   (c) contacting the hydrogen sulfide-treated catalyst with molecular oxygen at a partial pressure of at least one atmosphere and at a temperature ranging from 350° F. to 1100° F. for at least 30 minutes,
   (d) contacting the oxygen-treated catalyst with a cation exchange resin in the hydrogen cycle in an aqueous medium at a pH ranging from 2.7 to 4.2 at a temperature ranging from 120° F. to 250° F. for from 2 to 8 hours with a catalyst to resin ratio ranging from 0.25 gram to 3.0 grams per milliliter of wet cation exchange resin,
   (e) separating the contacted catalyst from the resin, and
   (f) returning the contacted catalyst to the hydrocarbon cracking process.

5. A method for the treatment of a silica-alumina cracking catalyst which has become contaminated with coke-forming and gas-forming metallic impurities during use to improve the hydrocarbon cracking characteristics of said catalyst which comprises
(a) contacting the contaminated catalyst at a temperature ranging from 900° F. to 1100° F. with a hydrogen sulfide-containing gas,
(b) contacting the hydrogen sulfide-treated catalyst with molecular oxygen at a partial pressure of at least one atmosphere and at a temperature ranging from 350° F. to 1100° F. for at least 30 minutes,
(c) contacting the oxygen-treated catalyst with a cation exchange resin in the hydrogen cycle in an aqueous medium at a pH such that the coke-forming and gas-forming metallic impurities are removed from the catalyst while the stability of the catalyst is substantially maintained,
(d) separating the catalyst from the resin, and
(e) drying the catalyst.

6. A method for the treatment of a silica-alumina cracking catalyst which has become contaminated with coke-forming and gas-forming metallic impurities during use to improve the hydrocarbon cracking characteristics of said catalyst which comprises
(a) contacting the contaminated catalyst at a temperature ranging from 900° F. to 1100° F. with a hydrogen sulfide-containing gas,
(b) contacting the hydrogen sulfide-treated catalyst with molecular oxygen at a partial pressure of at least one atmosphere and at a temperature ranging from 350° F. to 1100° F. for at least 30 minutes,
(c) contacting the oxygen-treated catalyst with a cation exchange resin in the hydrogen cycle in an aqueous medium at a pH ranging from 2.0 to 4.5 with a catalyst to resin ratio ranging from 0.25 gram to 3.0 grams per milliliter of wet cation exchange resin,
(d) separating the catalyst from the resin, and
(e) drying the catalyst.

7. A method for the treatment of a silica-alumina cracking catalyst which has become contaminated with coke-forming and gas-forming metallic impurities during use to improve the hydrocarbon cracking characteristics of said catalyst which comprises
(a) contacting the contaminated catalyst at a temperature ranging from 900° F. to 1100° F. with a hydrogen sulfide-containing gas,
(b) contacting the hydrogen sulfide-treated catalyst with molecular oxygen at a partial pressure of at least one atmosphere and at a temperature ranging from 350° F. to 1100° F. for at least 30 minutes,
(c) contacting the oxygen-treated catalyst with a cation exchange resin in the hydrogen cycle in an aqueous medium at a pH ranging from 2.0 to 4.5 at a temperature ranging from 75° F. to the temperature at which the cation exchange resin disintegrates for from 1 to 24 hours with a catalyst to resin ratio ranging from 0.25 gram to 3.0 grams per milliliter of wet cation exchange resin,
(d) separating the catalyst from the resin, and
(e) drying the catalyst.

8. A method for the treatment of a silica-alumina cracking catalyst which has become contaminated with coke-forming and gas-forming metallic impurities during use to improve the hydrocarbon cracking characteristics of said catalyst which comprises
(a) contacting the contaminated catalyst at a temperature ranging from 900° F. to 1100° F. with a hydrogen sulfide-containing gas,
(b) contacting the hydrogen sulfide-treated catalyst with molecular oxygen at a partial pressure of at least one atmosphere and at a temperature ranging from 350° F. to 1100° F. for at least 30 minutes,
(c) contacting the oxygen-treated catalyst with a cation exchange resin in the hydrogen cycle in an aqueous medium at a pH ranging from 2.7 to 4.2 at a temperature ranging from 120° F. to 250° F. for from 2 to 8 hours with a catalyst to resin ratio ranging from 0.25 gram to 3.0 grams per milliliter of wet cation exchange resin,
(d) separating the catalyst from the resin, and
(e) drying the catalyst.

References Cited in the file of this patent

UNITED STATES PATENTS

| | | |
|---|---|---|
| 2,129,693 | Houdry | Sept. 13, 1938 |
| 2,466,050 | Shabaker et al. | Apr. 5, 1949 |
| 2,683,683 | Mills | July 13, 1954 |
| 3,041,270 | Leum et al. | July 26, 1962 |

UNITED STATES PATENT OFFICE
CERTIFICATE OF CORRECTION

Patent No. 3,123,548                             March 3, 1964

James E. Connor, Jr., et al.

It is hereby certified that error appears in the above numbered patent requiring correction and that the said Letters Patent should read as corrected below.

Column 2, line 47, for "of" read -- to --; column 3, line 2, for "temperatures" read -- temperature --; column 5, line 2, for "catalystic" read -- catalytic --; column 7, line 41, for "an" read -- in --.

Signed and sealed this 7th day of July 1964.

(SEAL)
Attest:

ERNEST W. SWIDER                                        EDWARD J. BRENNER
Attesting Officer                                           Commissioner of Patents